(12) United States Patent
Sobel et al.

(10) Patent No.: US 7,366,919 B1
(45) Date of Patent: Apr. 29, 2008

(54) USE OF GEO-LOCATION DATA FOR SPAM DETECTION

(75) Inventors: William E Sobel, Stevenson Ranch, CA (US); Bruce McCorkendale, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 738 days.

(21) Appl. No.: 10/424,532

(22) Filed: Apr. 25, 2003

(51) Int. Cl.
- G06F 7/04 (2006.01)
- G06F 17/30 (2006.01)
- G06F 11/00 (2006.01)
- G06K 9/00 (2006.01)
- H04L 9/32 (2006.01)

(52) U.S. Cl. .......... 713/201; 713/150; 713/189; 726/2; 726/22; 726/26

(58) Field of Classification Search ............ 726/22, 726/24, 25; 713/150
See application file for complete search history.

(56) References Cited

U.S. PATENT DOCUMENTS

| | | | |
|---|---|---|---|
| 5,675,710 A | 10/1997 | Lewis | |
| 5,757,916 A * | 5/1998 | MacDoran et al. | 380/258 |
| 5,778,304 A * | 7/1998 | Grube et al. | 455/456.4 |
| 5,826,249 A | 10/1998 | Skeirik | |
| 5,887,269 A * | 3/1999 | Brunts et al. | 701/208 |
| 5,982,897 A * | 11/1999 | Clark | 380/258 |
| 6,023,723 A | 2/2000 | McCormick et al. | |
| 6,052,709 A | 4/2000 | Paul | |
| 6,072,942 A | 6/2000 | Stockwell et al. | |
| 6,088,803 A | 7/2000 | Tso et al. | |
| 6,154,172 A * | 11/2000 | Piccionelli et al. | 342/357.1 |
| 6,161,130 A | 12/2000 | Horvitz et al. | |
| 6,167,434 A | 12/2000 | Pang | |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,289,416 B1 | 9/2001 | Fukushima et al. | |
| 6,298,351 B1 | 10/2001 | Castelli et al. | |
| 6,314,409 B2 | 11/2001 | Schneck | |
| 6,324,569 B1 | 11/2001 | Ogilvie et al. | |
| 6,347,310 B1 | 2/2002 | Passera | |
| 6,370,526 B1 | 4/2002 | Agrawal et al. | |
| 6,370,629 B1 * | 4/2002 | Hastings et al. | 711/163 |

(Continued)

FOREIGN PATENT DOCUMENTS

WO   WO 01/71499 A1   9/2001

OTHER PUBLICATIONS outlook.spambully.com web pages [online]. Spam Bully [retrieved Jan. 16, 2003]. Copyright 2002. Retrieved from the Internet: <URL: http://outlook.spambully.com/about.php>.

(Continued)

*Primary Examiner*—Nasser Moazzami
*Assistant Examiner*—Chinwendu C Okoronkwo
(74) *Attorney, Agent, or Firm*—Fenwick & West LLP

(57) ABSTRACT

Computer implemented methods, apparati, and computer-readable media for detecting suspected spam in e-mail (24) originating from a sending computer (21). A method embodiment comprises the steps of determining (11) the actual IP address (23) of the sending computer (21); converting (12) the actual IP address (23) into geo-location data; and, using the geo-location data, ascertaining (13) whether the e-mail (24) contains suspected spam.

28 Claims, 2 Drawing Sheets

U.S. PATENT DOCUMENTS

| | | | |
|---|---|---|---|
| 6,397,200 B1 | 5/2002 | Lynch, Jr. et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,453,419 B1* | 9/2002 | Flint et al. | 726/3 |
| 6,456,991 B1 | 9/2002 | Srinivasa et al. | |
| 6,480,885 B1* | 11/2002 | Olivier | 709/207 |
| 6,487,586 B2 | 11/2002 | Ogilvie et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 | 11/2003 | Aronson et al. | |
| 6,687,740 B1 | 2/2004 | Gough | |
| 6,691,156 B1 | 2/2004 | Drummond et al. | |
| 6,697,942 B1 | 2/2004 | L'Heureux et al. | |
| 6,701,347 B1 | 3/2004 | Ogilvie | |
| 6,711,608 B1 | 3/2004 | Ogilvie | |
| 6,732,157 B1 | 5/2004 | Gordon et al. | |
| 6,757,713 B1 | 6/2004 | Ogilvie et al. | |
| 6,757,830 B1 | 6/2004 | Tarbotton et al. | |
| 6,859,791 B1* | 2/2005 | Spagna et al. | 705/51 |
| 6,901,346 B2 | 5/2005 | Tracy et al. | |
| 6,928,553 B2 | 8/2005 | Xiong et al. | |
| 7,155,484 B2* | 12/2006 | Malik | 709/206 |
| 2002/0016831 A1* | 2/2002 | Peled et al. | 709/219 |
| 2002/0038308 A1 | 3/2002 | Cappi | |
| 2002/0042687 A1 | 4/2002 | Tracy et al. | |
| 2002/0083343 A1 | 6/2002 | Crosbie | |
| 2002/0087641 A1 | 7/2002 | Levosky | |
| 2002/0087649 A1 | 7/2002 | Horvitz | |
| 2002/0087882 A1 | 7/2002 | Schneier et al. | |
| 2002/0138525 A1 | 9/2002 | Karadimitriou et al. | |
| 2002/0138581 A1 | 9/2002 | MacIntosh et al. | |
| 2002/0147694 A1 | 10/2002 | Dempsey et al. | |
| 2002/0147782 A1 | 10/2002 | Dimitrova et al. | |
| 2002/0157020 A1 | 10/2002 | Royer | |
| 2002/0165912 A1* | 11/2002 | Wenocur et al. | 709/203 |
| 2002/0199095 A1* | 12/2002 | Bandini et al. | 713/151 |
| 2002/0199186 A1 | 12/2002 | Ali et al. | |
| 2002/0199194 A1 | 12/2002 | Ali | |
| 2003/0033587 A1 | 2/2003 | Ferguson et al. | |
| 2003/0037251 A1 | 2/2003 | Frieder et al. | |
| 2003/0051026 A1 | 3/2003 | Carter | |
| 2003/0105864 A1* | 6/2003 | Mulligan et al. | 709/225 |
| 2003/0149726 A1 | 8/2003 | Spear | |
| 2003/0167311 A1 | 9/2003 | Kirsch | |
| 2003/0191969 A1 | 10/2003 | Katsikas | |
| 2003/0200334 A1 | 10/2003 | Grynberg | |
| 2003/0220978 A1 | 11/2003 | Rhodes | |
| 2003/0229672 A1 | 12/2003 | Kohn | |
| 2003/0229801 A1* | 12/2003 | Kouznetsov et al. | 713/200 |
| 2003/0233415 A1 | 12/2003 | Beyda | |
| 2004/0003283 A1 | 1/2004 | Goodman et al. | |
| 2004/0024823 A1 | 2/2004 | Del Monte | |
| 2004/0054887 A1 | 3/2004 | Paulsen et al. | |
| 2004/0064734 A1 | 4/2004 | Ehrlich | |
| 2004/0068534 A1 | 4/2004 | Angermayr et al. | |
| 2004/0073617 A1 | 4/2004 | Milliken et al. | |
| 2004/0093383 A1 | 5/2004 | Huang et al. | |
| 2004/0093384 A1 | 5/2004 | Shipp | |
| 2004/0111480 A1 | 6/2004 | Yue | |
| 2004/0148358 A1 | 7/2004 | Singh et al. | |
| 2004/0205173 A1 | 10/2004 | Hall | |
| 2005/0097179 A1* | 5/2005 | Orme | 709/207 |
| 2005/0144480 A1 | 6/2005 | Kim et al. | |

OTHER PUBLICATIONS cauce.org web pages [online]. Coalition Against Unsolicited Commercial Email [retrieved Mar 17, 2003]. Retrieved from the Internet: <URL: http://www.cauce.org/about/problem.shtml>.

NBEC/NWOCA Anti-Spam Tools, [online] [retrieved Jul. 7, 2004] retrieved from http://home.nwoca.org, Jul. 7, 2004.

Kularski, C. "Compound Procedures for Spam Control," Highland School of Technology, Jan. 2004.

"Technical Responses to Spam," Nov. 2003, Taughannock Networks.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

Wikipedia.org web pages (online). Wikipedia (retrieved Mar. 17, 2003). Retrieved from the Internet: <URL: http://www.wikipedia.org/w/wiki.phtml?title=Machine learning & printable=yes>.

Outlook.spambully.com web pages [online] Spam Bully [retrieved Jan. 16, 2003] Copyright 2002, Retrieved from the Internet <URL: http://outlook.spambully.com/about.php>.

AirCERT web page, last updated Sep. 18, 2000 [online]. Cert.org [retrieved Apr. 18, 2003]. Retrieved from the Internet:URL:http://www.cert.org/kb/aircert/, U.S.A.

Analysis Console for Intrusion Detection (ACID) web page [online]. Andrew.cmu.edu [retrieved Apr. 18, 2003]. Retrieved from the InternetURL:http://www.andrew.cmu.edu/~rdanyliw/snort/snortacid.html, U.S.A.

"Caltarian Security Technology Platform," Riptech web pages [online]. Symantec.com [retrieved Apr. 18, 2003]. Retrieved from the Internet: URL:http//enterprisesecurity.symantec.com/Content/displayPDF.cfm?SSSPDFID=35&EID=O, U.S.A.

Change log for Analysis Console for Intrusion Detection (Acid), indicating release date of Sep. 8, 2000 [online]. Andrew.cmu.edu [retrieved Apr. 18, 2003]. Retrieved from the Internet:URL:http://www.andrew.cmu.edu/~rdanyliw/snort/CHANGELOG, U.S.A.

Chung, C., Gertz, M. and Levitt, K., "DEMIDS: A Misuse Detection System for Database Systems," Department of Computer Science, University of California at Davis, Oct. 1, 1999, pp. 1-18.

CyberGuard Corporation, "*CyberGuard and Webwasher: The Value Proposition*," A CyberGuard Corporation White Paper, May 2004, 6 pages.

e=Security, Inc., Correlation Technology for Security Event Management, Oct. 7, 2002 [online]. eSecurityins.com [retrieved Apr. 18, 2003]. Retrieved from the Internet:URL:http://www.esecurityinc.com/downloads/Correlation_WP.pdf, Vienna, VA.

Lee, Sin Yeung; Low, Wai Lup and Wong, Pei Yuen, "Learning Fingerprints for a Database Intrusion Detections System," Computer Security Laboratory, DSO National Laboratories, Singapore, ESORICS Nov. 2002, LNCS 2502, pp. 264-279.

Low, Wai Lup, et al., "DIDAFIT: Detecting Intrusions in Databases Through Fingerprinting Transactions," ICEIS 2002, Fourth International Conference on Enterprise Information Systems, vol. 1, Apr. 3-6, 2002, pp. 121-128, Ciudad Real, Spain.

Marketing, "*Digital Certificates—Best Practices—A Microdasys Whitepaper*," bestpractice.doc, Revision 1/1 (Jul. 31, 2003), 6 pages, Czech Republic.

Microdasys, "*SCIP Secured Content Inspection: Protecting the Enterprise from CryptoHacks*," 2003 by Microdasys Inc., 2 pages, Czech Republic.

MyNEtWatchman.com web pages indicating Sep. 2000 beta release [online]. MyNetWatchman.com [retrieved Apr. 18, 2003]. Retrieved from the Internet: URL:http://www.mynetwatchman.com/mynetwatchman/relnotes.htm, Alpharetta, GA.

Network Computing Solutions—"*Microdasys SCIP*" [online]. Retrieved on Mar. 18, 2005. Retrieved from the Internet:URL:http://www.ncs.cz/index.php?language=en&menuitem-4&subitem=13, 2 pages, Czech Republic.

Network Computing Solutions—NSC Homepage—*News* [online]. Retrieved on Mar. 18, 2005. Retrieved from the Internet:URL:http://www.nsc.cz/index.php?language=en&menuitem=0&subitem=4&subitem=13, 3 pages, Czech Republic.

Schneier, Bruce, Managed Security Monitoring: Network Security for the 21st Century, 2001 [online]. Counterpane.com [retrieved Apr. 18, 2003]. Retrieved from the Internet:URL:http://www.counterpane.com/msn.pdf, U.S.A.

SCIP Product, Microdasys—"*The need to control, inspect and manage encrypted webtraffic*." [online]. Retrieved on Mar. 18, 2005. Retrieved from the Internet:URL:http://www.microdasys.com/scipproduct+M54a708de802.html. Author unknown, 2 pages, Czech Republic.

Slashdot.org web pages describing Dshield, dated Nov. 27, 2000 [online]. Slashdot.org [retrieved Apr. 18, 2003]. Retrieved from the Internet: URL:http://slashdot.org/article.pl?sid=00/11/27/1957238&mode=thread, U.S.A.

"*SSL Stripper Installation Guide*," [online]. Retrieved in Mar. 2005 from the Internet:URL:http://www.sslstripper.com, 2 pages, U.S.A.

SSL Stripper Home Page, "*Security Solutions: SSL Stripper*," [online]. Retrieved on Mar. 18, 2005. Retrieved from the Internet:URL:http://www.vroyer.org/sslstripper/index.html, 2 pages, Oct. 15, 2004, U.S.A.

SSL Stripper Sample Screenshots, "*Security Solutions: Sample Screenshots*," [online]. Retrieved on Mar. 18, 2005. Retrieved from the Internet:URL:http://www.vroyer.org/sslstripper/screenshots.html, 3 pages, Oct. 15, 2004, U.S.A.

Web page, announcing Nov. 11, 2000 release of Dshield [online]. Deja.com [retrieved Apr. 18, 2003]. Retrieved from the Internet:URL:http://groups.google.com/groups?selm=8vm48v%245pd%241%40nnrp1.deja.com&oe=UTF-8&output=gplain, U.S.A.

Webwasher AG/Full feature set,"*Full feature set,*" [online]. Retrieved on Mar. 18, 2005. Retrieved from the Internet:URL:http://www.webwasher.com/enterprise/products/webwasher_products/ssl_scanner/full_feature_set.html?l..., 2 pages.

Webwasher AG/Webwasher 1000 CSM Appliance, "*Webwasher 1000 CSM Appliance*," [online]. Retrieved on Mar. 18, 2005. Retrieved from the Internet:URL:http://www.webwasher.com/enterprise/products/webwasher_products/scm_applicance/index... 2 pages.

Webwasher AG/Webwasher URL Filter, "*Webwasher URL Filter*," [online]. Retrieved on Mar. 18, 2005. Retrieved from the Internet:URL:http://www.webwasher.com/enterprise/products/webwasher_products/webwasther_url_filter.. 1 page.

Webwasher AG/Webwasher Anti Virus, "*Webwasher Anti Virus*," [online]. Retrieved on Mar. 18, 2005. Retrieved from tdhe Internet:URL:http://www.webwasher.com/enterprise/products/webwasher_products/anti_virus/index.html..., 2 pages.

Webwasher AG/Webwasher Anti Spam, "*Webwasher Anti Spam*," [online]. Retrieved on Mar. 18, 2005. Retrieved from the InternetURL:http://www.webwashter.com/enterprise/products/webwasher_products/anti_spam/index.htm..., 1 page.

Webwasher AG/Webwasher Content Protection,"*Webwasher Content Protection*," [online]. Retrieved on Mar. 18, 2005. Retrieved from the Internet:URL:http://www.webwashter.com/enterprise/products/webwasher_products/content_protection/index.html, 2 pages.

Webwasher AG/Webwasher SSL Scanner, "*Webwasher SSL Scanner*," [online]. Retrieved on Mar. 18, 2005. Retrieved from the Internet:URL:http://www.webwasher.com/enterprise/products/webwasher_products/ssl_scanner/index.html, 2 pages.

2000 Review of eSecurity product on Network Security web page [online]. SCMagazine.com [retrieved Apr. 18, 2003]. Retrieved from the Internet:<URL:http://www.scmagazine.com/scmagazine/2000_12/testc/network.htm#Open>.

* cited by examiner

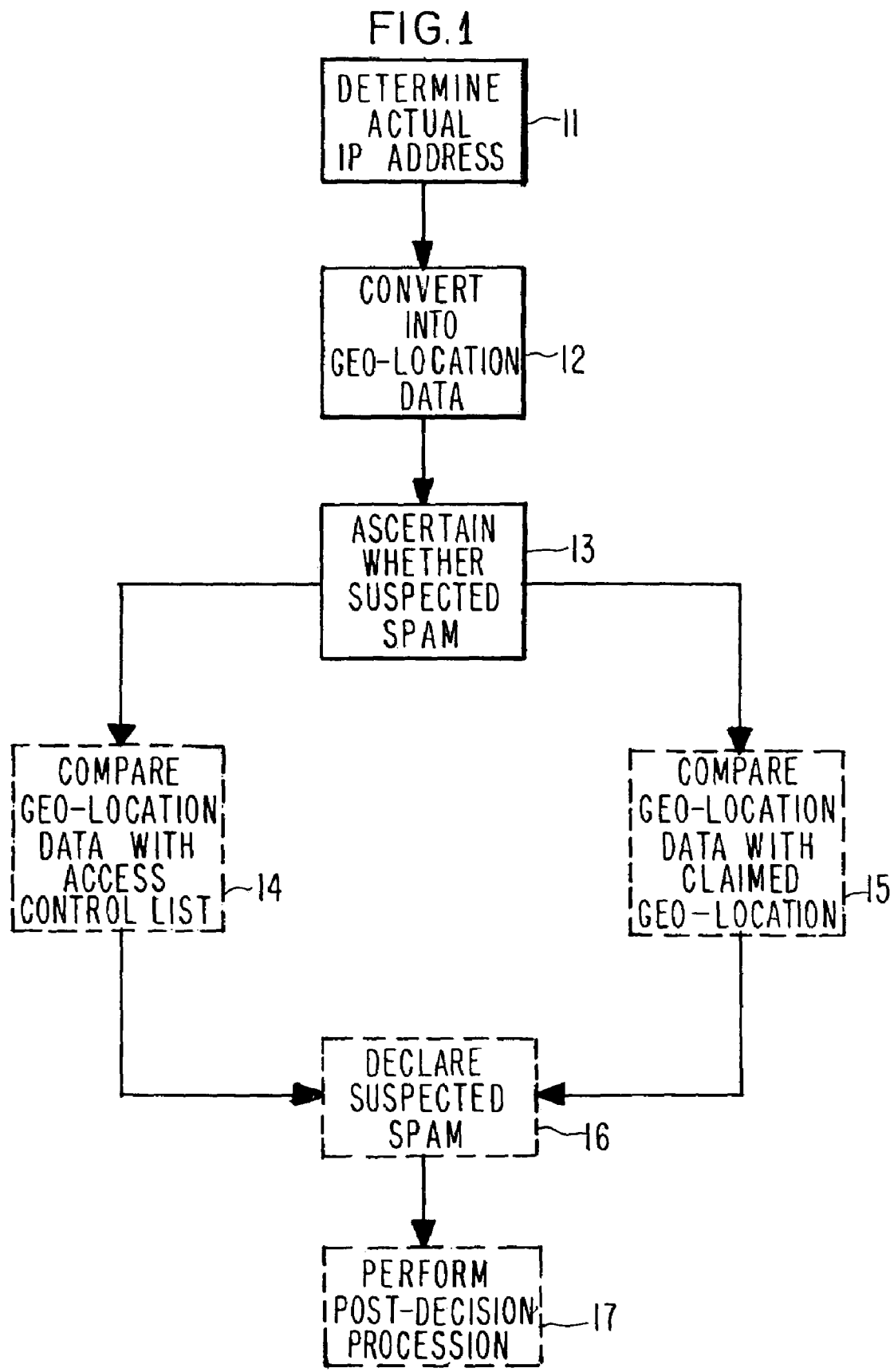

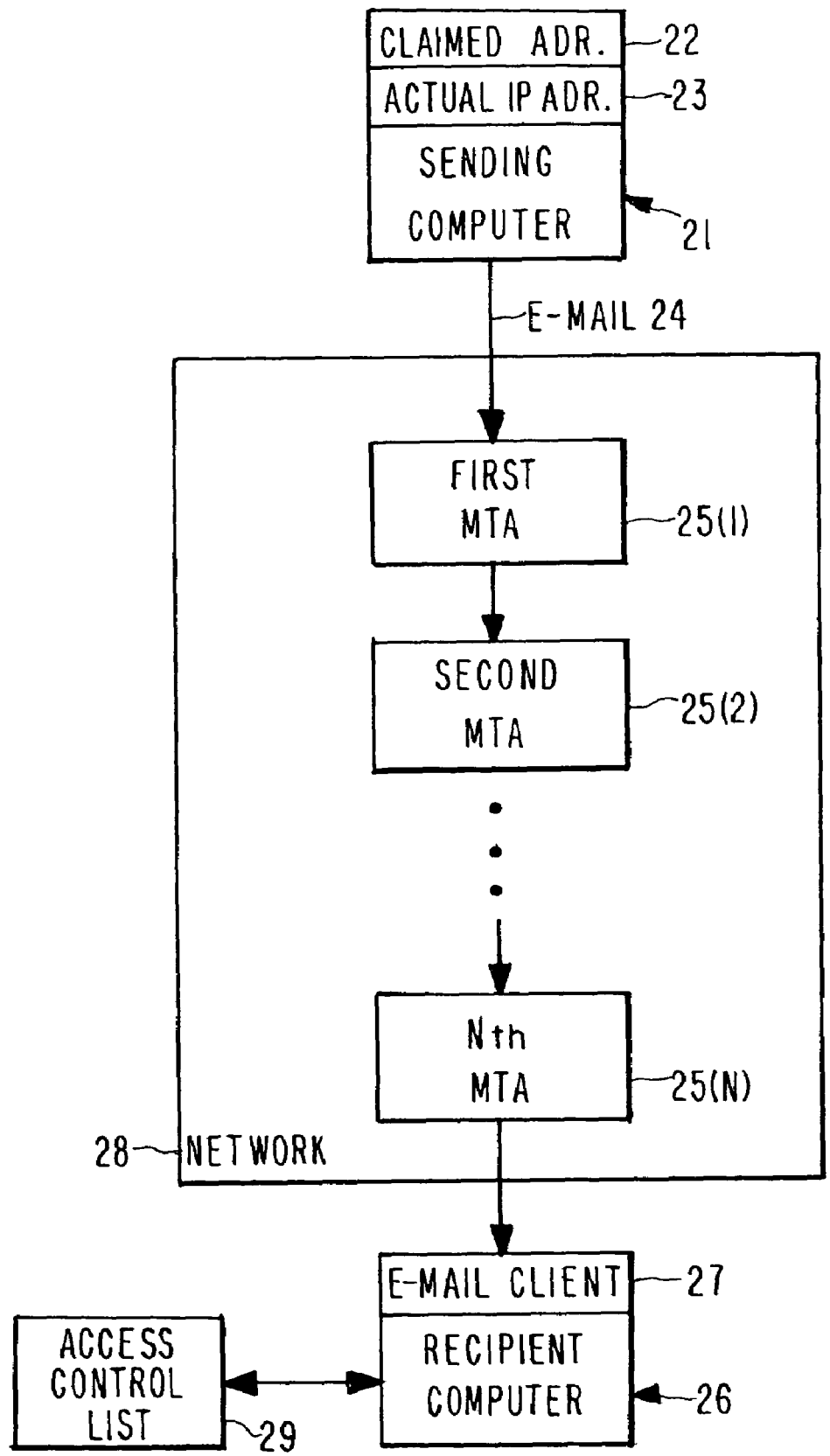

USE OF GEO-LOCATION DATA FOR SPAM DETECTION

TECHNICAL FIELD

This invention pertains to the field of reducing the amount of spam to which a computer is subjected.

BACKGROUND ART

As used throughout this specification including claims, "spam" is any e-mail that is unwanted by the recipient. As spam has regrettably become more widely prevalent, techniques to combat spam are beginning to emerge. One such technique is to allow e-mail recipients to specify a list of addresses, domains, and/or top-level domains to be always blocked or automatically allowed. The "block" list is often referred to as a "blacklist", while the "allow" list is often referred to as a "whitelist". The inspiration behind blacklists and whitelists is the observation that most computer users exchange e-mail with a relatively small and fixed set of addresses. These addresses are on a smaller list of domains, and these domains are on an even smaller list of top-level domains. A significant amount of spam comes from addresses, domains, and top-level domains that a user rarely, if ever, legitimately interacts with. Blocking entire domains or top-level domains (as well as addresses) thus becomes a relatively easy way to block a significant amount of spam. There is a need to improve the use of whitelists and blacklists in fighting spam. Much spam also comes from addresses claiming to be on common domains such as yahoo.com, msn.com, aol.com, and hotmail.com. Blocking these domains would, for most computer users, block too much legitimate e-mail. Furthermore, many spammers falsely indicate that they are sending e-mails from such common domains when, in reality, they are not. In other words, the spammer is spoofing his or her address. There is a need to develop techniques to counter such spoofing.

DISCLOSURE OF INVENTION

Computer implemented methods, apparati, and computer-readable media for detecting suspected spam in e-mail (24) originating from a sending computer (21). A method embodiment comprises the steps of determining (11) the actual IP address (23) of the sending computer (21); converting (12) the actual IP address (23) into geo-location data; and, using the geo-location data, ascertaining (13) whether the e-mail (24) contains suspected spam.

BRIEF DESCRIPTION OF THE DRAWINGS

These and other more detailed and specific objects and features of the present invention are more fully disclosed in the following specification, reference being had to the accompanying drawings, in which:

FIG. 1 is a flow diagram illustrating a method embodiment of the present invention.

FIG. 2 is a block diagram illustrating apparatus used in the present invention.

DETAILED DESCRIPTION OF THE PREFERRED EMBODIMENTS

As used throughout this specification including claims, the following terms have the following meanings:

"OSI" is the Open System Interconnect model developed by the International Standardization Organization (ISO) in 1984. This model, described at http://www.4d.com.docs/cmu/cmu79892.htm, describes how data is transferred from an application on one computer to an application on another computer. The OSI model comprises seven different layers.

"TCP" is the Transmission Control Protocol. It operates at the transport layer (layer 4) of the OSI model to establish data transmission reliability.

"IP" is the Internet Protocol.

"IP address" is the unique address of a computer that is coupled to the Internet. The IP address has the form #.#.#.#, where each # is a number from zero to 255. For example, an IP address might be 66.120.211.171.

"IANA" is the Internet Assigned Number Authority, an agency given authority by the U.S. government to assign domain names.

"DNS" is the Domain Name System.

"DNS address" is an address of a computer, complying with the DNS and expressed in a form that is relatively user friendly compared with the IP address. An example of a DNS address is fenwick.com. In this address, "fenwick" is a domain and ".com" is the top-level domain. The top-level domain may also be a country.

"SMTP" is the Simple Mail Transfer Protocol, a protocol which currently governs all e-mail sent over the Internet.

"MTA" is Mail Transfer Agent, a computer such as a large server computer that forwards e-mail from a sending computer to a recipient computer.

"Access Control List" is a whitelist or a blacklist, as those terms have been defined above.

"Coupled" encompasses any direct or indirect coupling or connection.

"Network" is any wired or wireless network, such as the Internet, a Local Area Network (LAN), or a Wide Area Network (WAN).

In the present invention, and with reference to FIG. 2, a sending computer 21 sends an e-mail 24 to a recipient computer 26 over a network 28. An access control list 29 may be associated with recipient computer 26. If the e-mail 24 is unwanted by the recipient computer 26, the e-mail 24 is said to be spam or to contain spam. Within network 28 may be one or more MTA's 25. FIG. 2 illustrates N MTA's. N can be any positive integer.

Sending computer 21 has a unique actual IP address 23 as well as a claimed address 22, which may be expressed as an IP address or as a DNS address. If the user of sending computer 21 wishes to include spam within e-mail 24, said user is referred to as a spammer. A spammer may spoof an innocuous claimed address 22 that is not an actual address of sending computer 21. This may lull the user of recipient computer 26 into thinking that the e-mail 24 does not contain spam, because this claimed address 22 may be presented to the user of recipient computer 26 via e-mail client software 27 associated with recipient computer 26.

FIG. 1 illustrates the method of the present invention as having three generic steps: 11, 12, and 13. In step 11, the actual IP address 23 of sending computer 21 is determined. At step 12, the actual IP address 23 is converted into geo-location data, which is data giving the actual geographical location of sending computer 21. The geo-location data may be any type of geographical information such as city, county, state, country, or presence within a pre-selected radius of a geographical point. The conversion of the actual IP address 23 into geo-location data at step 12 may be performed by a software program such as Geobytes. Such software programs were designed for marketing purposes, e.g., letting the owner of a Website know where most of his hits are coming from so he can tailor his marketing approach accordingly. Geobytes includes with the geo-location data a confidence number from 1 to 100, with 1 representing virtually no confidence in the geo-location data offered by the program, and 100 representing complete confidence. In one embodiment, a pre-selected confidence threshold level between 1 and 100 is selected by the user of the present invention, and only geo-location data exceeding the pre-selected threshold is used; all other geo-location data is ignored as being unreliable.

At step 13, it is ascertained whether e-mail 24 contains suspected spam. Steps 11, 12, and 13 may be performed by one or more modules associated with recipient computer 26 and/or with one of the MTA's 25. Said modules can be implemented in hardware, firmware, and/or software. A module may take the form of a standalone software program, a plug-in module, or a proxy situated in front of (with respect to sending computer 21) computer 26 or MTA 25. When the modules of the present invention are embodied in software, they may reside on any computer-readable medium such as a hard disk, floppy disk, CD, DVD, etc.

It may be that the module performing step 12 may not be able to successfully convert the actual IP address 23 into geo-location data. In such a case, the converting module may indicate "unknown" rather than the name of a geographical entity or location. When this happens, in one embodiment, particularly useful when the claimed domain of sending computer 21 is not common, ascertaining step 13 is programmed to automatically declare that suspected spam is not present in e-mail 24. Examples of common domains are yahoo.com. msn.com, aol.com, and hotmail.com. In an alternative embodiment, particularly useful when the claimed domain within address 22 of sending computer 21 is common, the ascertaining step 13 is automatically programmed to declare that suspected spam is present in e-mail 24. The theory behind this alternative embodiment is that if the domain really is in fact is a common actual domain, and not a spoofed domain, the geo-location data should not be returned as "unknown".

Alternative embodiments for implementing step 13 are illustrated in FIG. 1 by means of steps 14 and 15. In a first embodiment of the present invention, at step 14 the actual geo-location data of sending computer 21 is compared with an access control list, which might be a whitelist or a blacklist. To illustrate the use of a whitelist 29, let us assume that whitelist 29 contains the name of the city Cincinnati. Then, when the geo-location data shows that the actual location of the sending computer 21 is Cincinnati, recipient computer 26 automatically accepts the e-mail 24, without any further analysis as to whether e-mail 24 contains spam or not. To illustrate the use of a blacklist 29, let us assume that blacklist 29 contains an entry for the country of China. Then, whenever the geo-location data indicates that the actual location of sending computer 21 is China, computer 26 or MTA 25 automatically treats e-mail 24 as containing suspected spam (step 16).

Once a declaration has been made that e-mail 24 contains suspected spam at step 16, post-decision processing can be performed at step 17. For example, e-mail 24 can be refused by recipient computer 26; the suspected spam can be deleted from e-mail 24; e-mail 24 can be subjected to further processing by a spam filter; e-mail 24 can be tagged as containing suspected spam; e-mail 24 can be moved to a special folder where the user of recipient computer 26 can later check it in case there was a false positive; a composite spam score maintained by recipient computer 26 can be augmented; and/or e-mail 24 can be modified. When optional step 17 is not used, the declaration at step 16 is that "spam is present" rather than "suspected spam is present".

The determination at step 11 of the actual IP address 23 can be made at a time when sending computer 21 connects with an MTA 25. At that time, pursuant to the SMTP protocol, sending computer 21 initiates the sending of an e-mail 24 by issuing a HELO or EHLO command. Following the word HELO or EHLO, sending computer 21 inserts a claimed address 22, which can be spoofed. However, the actual IP address 23 can be determined by a conventional module associated with computer 26 or MTA 25, by examining what is happening at the transport layer using a knowledge of TCP. Alternatively, or in addition to said method for determining the actual IP address 23, the actual IP address 23 can be determined by a conventional module associated with computer 26 or MTA 25, by examining a return path header associated with e-mail 24, again, by using a knowledge of TCP to observe what is transpiring at the transport layer. An example of a set of return path headers is giving in the following:

1 Return-path: <ronronron@eudoramail.com>
2 Received: from 207.118.30.214 (unverified [216.96.57.133]) by
3 mail01.corp.xyz.com
4 (SMTPRS) with SMTP id
5 <B0002012226@mail01.corp.xyz.com> for <bill@xyz.com>;
6 Mon, 24 Mar. 2003 03:37:15-0800
7 Received: from 285 bpq3wz2mfu [25.149.92.80] by
8 206.117.30.214 with ESMTP id
9 JRAZX; Mon, 24 Mar 03 06:33:15 +0400
10 Received: from 6zd6.gs5gs4 [78.32.232.240] by
11 25.149.92.80 with ESMTP id
12 HLXCVRMFX; Mon, 24 Mar 03 06:17:15 +0400
13 Message-ID: <ple3-$3z2ig27xzw@i7t.mvuv>>
14 From: "Carmine Opera"<ronronron@eudoramail.com>
15 To: bill@xyz.com
16 Date: Mon, 24 Mar 03 06:17:15 GMT
17 X-Priority: 3
18 X-MSMail-Priority: Normal
19 X-Mailer: MIME-tools 5.503 (Entity 5.501)
20 MIME-Version: 1.0
21 Content-Type: multipart/alternative;
22 boundary="1._F_.14_A.3"
23 X-SYMC-SmtpMailFrom: ronronron@eudoramail.com
24 X_SYMCFilter-IP: 216.96.57.133
25 X-SYMCFilter-Path-1: 216.96.57.133 [last relay]
26 (US;US;United States;KS;Kansas;Effingham;96)
27 X-SYMCFilter-Path-2: 25.149.92.80 [prior relay](unknown)
28 X-SYMCFilter-Path-3: 78.32.232.240 [prior relay] (unknown)
29 X-SYMCFilter-Reason: bill@xyz.com bill@xyz.com 1 Found
30 10.0.0.14 on BackupTrap list
31 Subject: [FILTERED] Admin.the nature of the search
32 engines uaieyfosbjjlld The return path header that should be examined is that associated with the MTA 25 that is closest to the sending computer 21, as long as said closest MTA 25 and each MTA 25 situated between said closest MTA 25 and said recipient computer 26 is trusted by recipient computer 26. "Trust" can be defined in a number of ways. For example, recipient computer 26 can be said to trust an MTA 25 when the MTA 25 is co-located with recipient computer 26 in a common enterprise, such as a corporation, university, or government agency. Alternatively, recipient computer 26 can be said to trust an MTA 25 when the MTA 25 appears on a list of trusted computers kept by recipient computer 26. Alternatively, recipient computer 26 can be said to trust an MTA 25 when the recipient computer 26 has never been spoofed by the MTA 25.

In the above exemplary set of return path headers, the DNS address ronronron@eudoramail.com appearing on line 1 is a spoofed address 22 claimed by sending computer 21. The IP address 207.118.30.214 appearing on line 2 is the IP address corresponding to this spoofed DNS address 22. Such an IP address can be determined, for example, by consulting the WHOIS database. The IP address 216.96.57.133 appearing on line 2 is the actual IP address 23 of computer 21 as determined by an inventive module as described herein. In this example, there are three MTA's 25 situated between sending computer 21 and recipient computer 26. The return path header for the last MTA 25(3) is given on line 25. The return path header for the second MTA 25(2) is given on line 27. The return path header for the first MTA 25(1) is given on line 28. As can be seen from line 25, the IP address of the last MTA 25(3) is 216.96.57.133. This was determined by step 11 using TCP, as described above. Line 26 shows the results of applying step 12 to this IP address 23. The converting means of step 12 has determined that this MTA 25(3) is located in Effingham, Kansas, United States of America, with a confidence level of 96. As can be seen from the word "unknown" appearing on lines 27 and 28, the converting means of step 12 was not able to produce geo-location data for MTA 25(2) or MTA 25(1), respectively.

In an alternative embodiment of the present invention, at step 15 the geo-location data produced at step 12 is compared with a claimed geo-location claimed by sending computer 21. This claimed geo-location may be derived from domain information inserted by sending computer 21 in an outgoing e-mail 24. For example, in the SMTP protocol, the sending of an e-mail 24 is initiated by sending computer 21 indicating its desire to connect to an MTA 25 by generating a HELO or EHLO command having an address as an argument. At this time, a spammer in control of sending computer 21 may insert a bogus address following the word HELO or EHLO. There are other places where the spammer can falsify the address 22, e.g., as part of a MAILFROM command. This bogus address 22 may be presented to the user of recipient computer 26 via e-mail client software 27 associated with recipient computer 26.

In this embodiment of the present invention, a DNS address 22 claimed by the sending computer 21 is resolved into a location or a set of locations corresponding to the claimed address 22. If the actual geo-location obtained in step 12 matches one of these resolved locations, ascertaining step 13 determines that e-mail 24 does not contain suspected spam. If, on the other hand, the actual geo-location obtained from step 12 does not match one of these resolved locations, a declaration is made at step 16 that e-mail 24 contains suspected spam. For example, if it is known that the domain from the claimed address 22 has an MTA 25 in five countries, but the actual geo-location of computer 21 is in a sixth country, suspected spam is declared at step 16. Similarly, if it is known that said domain does not have an MTA 25 in China, and the geo-location report from step 12 indicates that the actual location of computer 21 is in China, suspected spam is likewise declared at step 16.

The resolved locations may be obtained by examining the domain name within the claimed DNS address 22. One or more databases can be created over time giving resolved locations for each of a set of domains. These databases can be created by any one or more of a number of various techniques. For example, the owner of the domain (such as aol.com) may publish locations where its MTA's 25 are located. Alternatively, database entries may be compiled by machine learning techniques such as neural networks, Bayesian classifiers, or support vector machines. For example, the training process may identify those domains responsible for the most e-mail traffic to an MTA 25 and the associated geo-locations for those domains. The training process can be performed by updating a database containing the domain name, its associated IP address, geo-location data for this IP address, and a count of each incoming e-mail for that domain. One can have a pre-selected confidence threshold level. For example, let us assume that this threshold is set at 5000. If the training process indicates that there are at least 5000 matches of the domain "aol.com" with the location "Boise, Id.", one can safely assume that there is in fact an aol MTA 25 located in Boise, Id. In this example, spammers who are spamming the domain name aol.com will likely have their locations resolved to a large plurality of locations, each of which will experience far fewer than 5000 counts.

A database trained by machine learning techniques can be offered by a software publisher to its customers 26 so that each customer computer 26 does not have to perform this training process itself.

In an alternative embodiment, a database of resolved locations can be compiled by simply noticing locations from which a large amount of e-mail has emanated. In all of these embodiments, a database may be compiled only with respect to e-mail allegedly emanating from common domains, on the theory that e-mail allegedly emanating from uncommon domains will not be prolific enough to make for a reliable database. Examples of common domains include yahoo.com, msn.com, aol.com, and hotmail.com. Another way of defining "common" is to require that, during a machine learning training phase such as described above, at least a certain preselected threshold percentage worth of total e-mail traffic observed during the training phase must be exceeded in order for the domain to be classified as "common".

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, the principles of the present invention can be applied to any protocol in any electronic messaging system where the actual location of the sender of the electronic message can be determined, and thus checked against where the sender claims to be, to see whether the sender is lying.

What is claimed is:

1. A computer implemented method for detecting suspected spam in e-mail originating from a sending computer, said method comprising the steps of:
   determining an actual IP address of the sending computer;
   converting the actual IP address into actual geo-location data; and
   using the actual geo-location data, ascertaining whether the e-mail contains suspected spam.

2. The method of claim 1 further comprising, when the ascertaining step finds that the e-mail contains suspected spam, at least one of the following steps:
   refusing the e-mail;
   deleting the suspected spam from the e-mail;
   processing the e-mail by a spam filter;
   tagging the e-mail as containing suspected spam;
   moving the e-mail to a special folder;
   augmenting a composite spam score;
   modifying the e-mail.

3. The method of claim 1 wherein the actual IP address is determined when the sending computer connects to a mail transfer agent.

4. The method of claim 3 wherein the actual IP address is gleaned from a transport layer using TCP.

5. The method of claim 1 wherein the actual IP address is determined from a return path header associated with the e-mail.

6. The method of claim 5 wherein:
   the e-mail is received by a recipient computer;
   there are a plurality of mail transfer agents situated between the sending computer and the recipient computer; and
   the determining step comprises deriving the IP address from the return path header associated with the mail transfer agent that is closest to the sending computer, as long as said closest mail transfer agent, and each mail transfer agent situated between said closest mail transfer agent and said recipient computer, is trusted by the recipient computer.

7. The method of claim 6 wherein a mail transfer agent is trusted by the recipient computer when one of the following conditions is satisfied:
   the mail transfer agent is co-located with the recipient computer in a common enterprise;
   the mail transfer agent appears on a list of trusted computers that is kept by the recipient computer;
   the recipient computer has never been spoofed by the mail transfer agent.

8. The method of claim 1 wherein:
   the converting step is not able to provide geo-location data;
   the sending computer's claimed domain is not common; and
   the ascertaining step does not deem that suspected spam is present in the e-mail.

9. The method of claim 1 wherein:
   the converting step is not able to provide actual geo-location data;
   the sending computer's claimed domain is common; and
   the ascertaining step deems that suspected spam is present in the e-mail.

10. The method of claim 1 wherein the actual geo-location data has a confidence number associated therewith; and
    the ascertaining step is performed only when the confidence number exceeds a pre-selected threshold.

11. The method of claim 1 wherein the ascertaining step comprises comparing the actual geo-location data with an access control list.

12. The method of claim 11 wherein the access control list is a whitelist.

13. The method of claim 11 wherein the access control list is a blacklist.

14. The method of claim 11 wherein the actual geo-location data is data pertaining to an entity from the group of entities comprising city, county, state, country, and presence within a preselected radius of a geographical point.

15. The method of claim 1 wherein the ascertaining step comprises comparing the actual geo-location data with a claimed geo-location claimed by the sending computer.

16. The method of claim 15 wherein the claimed geo-location is derived from domain information inserted by the sending computer as part of a HELO or EHLO command pursuant to a SMTP protocol.

17. The method of claim 15 wherein:
    the e-mail is received by a recipient computer; and
    the claimed geo-location is derived from a DNS address appearing in e-mail client software associated with the recipient computer.

18. The method of claim 15 wherein the claimed geo-location:
    is derived from a DNS address claimed by the sending computer; and
    is a location where a domain within the DNS address has a mail transfer agent.

19. The method of claim 18 wherein locations where the domain has a mail transfer agent are listed in a database from the group of databases comprising:
    a database listing locations disclosed by an owner of the domain;
    a database compiled by machine learning techniques;
    a database compiled by noticing locations from which a large amount of e-mail has emanated.

20. The method of claim 19 wherein the database is compiled only with respect to e-mail allegedly emanating from common domains.

21. The method of claim 20 wherein a domain is deemed to be common during a training phase by virtue of being responsible for at least a certain preselected threshold percentage worth of total e-mail traffic observed during the training phase.

22. The method of claim 1 wherein at least one of the determining, converting, and ascertaining steps is performed by a client computer receiving the e-mail.

23. The method of claim 1 wherein at least one of the determining, converting, and ascertaining steps is performed by a mail transfer agent computer that processes the e-mail.

24. A computer program product for detecting suspected spam in e-mail originating from a sending computer, comprising:
    a computer-readable medium; and
    computer program code, encoded on the computer-readable medium, for:
       determining an actual IP address of the sending computer;
       converting the actual IP address into actual geo-location data; and
       using the actual geo-location data, ascertaining whether the e-mail contains suspected spam.

25. The computer program product of claim 24 wherein the ascertaining step comprises comparing the actual geo-location data with an access control list.

26. The computer program product of claim 24 wherein the ascertaining step comprises comparing the actual geo-location data with a claimed geo-location claimed by the sending computer.

27. An apparatus for detecting suspected spam in e-mail originating from a sending computer, said apparatus comprising:

means for determining an actual IP address of the sending computer;

coupled to the determining means, means for converting the actual IP address into actual geo-location data; and coupled to the converting means, means for ascertaining, using the actual geo-location data, whether the e-mail contains suspected spam.

28. The method of claim 1 wherein the geo-location data comprises data identifying an actual geographical location of the sending computer.

* * * * *